United States Patent
Lee et al.

(10) Patent No.: US 7,206,513 B2
(45) Date of Patent: Apr. 17, 2007

(54) POLARIZATION MODE DISPERSION COMPENSATION APPARATUS USING A PHOTONIC CRYSTAL STRUCTURE

(75) Inventors: Hong-seok Lee, Sungnam-si (KR); Ji-deog Kim, Seoul (KR); Il-kwon Moon, Suwon-si (KR); Suk-han Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 669 days.

(21) Appl. No.: 10/636,735

(22) Filed: Aug. 8, 2003

(65) Prior Publication Data

US 2004/0114937 A1 Jun. 17, 2004

(30) Foreign Application Priority Data

Aug. 9, 2002 (KR) .................. 10-2002-0047167

(51) Int. Cl.
*H04J 14/02* (2006.01)

(52) U.S. Cl. ........................................... 398/81; 398/65

(58) Field of Classification Search ................ 398/148, 398/147, 81, 136, 158, 192, 65, 152, 184, 398/205
See application file for complete search history.

(56) References Cited

U.S. PATENT DOCUMENTS

| | | | |
|---|---|---|---|
| 5,930,414 A | 7/1999 | Fishman et al. | |
| 6,175,671 B1 | 1/2001 | Roberts | |
| 6,493,473 B1 * | 12/2002 | Wooten | ..................... 385/11 |
| 2002/0021878 A1 | 2/2002 | Allan et al. | |
| 2002/0075477 A1 | 6/2002 | Yu et al. | |

FOREIGN PATENT DOCUMENTS

| | | |
|---|---|---|
| EP | 0 964 237 A1 | 12/1999 |
| JP | 11-196046 | 7/1999 |
| JP | 2000-131522 | 5/2000 |
| JP | 2001-021848 | 1/2001 |
| JP | 2002-131794 | 5/2002 |
| JP | 2002-196296 | 7/2002 |

OTHER PUBLICATIONS

Winters et al "Experimenteal Equalization . . . ", IEEE Photonics Tech. Letters, 2(8):591-593, (Aug. 1990).
Hakki, "Polarization Mode Dispersion . . . " IEEE Photonics Tech. Letters, 9(1):121-123 (Jan. 1997).
Jiang, et al., "Silicon-based photonic crystal heterostructure", Applied Physics Letters, vol. 79, No. 21, pp. 3395-3397 (Nov. 19, 2001).

* cited by examiner

*Primary Examiner*—David C. Payne
(74) *Attorney, Agent, or Firm*—Lee & Morse, P.C.

(57) ABSTRACT

A polarization mode dispersion compensation apparatus using a photonic crystal structure includes an optical signal splitter for splitting and outputting incident optical signals into optical signals of a first and second polarization state; an optical signal combiner for combining and outputting the optical signals of the first and second polarization states; an optical signal guide having a photonic crystal structure having a first waveguide and a longer and variable second waveguide; a signal tab for externally outputting a portion of the optical signals and for outputting a portion of the optical signals to a feedback unit; a feedback unit for measuring a dispersion degree of the first and second polarization states inputted from the signal tab, and for outputting a feedback signal for removing the polarization mode dispersion; and an effective optical path length variation unit for varying an effective optical path length of the second waveguide.

16 Claims, 5 Drawing Sheets

POLARIZATION MODE DISPERSION COMPENSATION APPARATUS USING A PHOTONIC CRYSTAL STRUCTURE

BACKGROUND OF THE INVENTION

1. Field of the Invention

The present invention relates to a polarization mode dispersion compensation apparatus in an optical transmission system. More particularly, the present invention relates to a polarization mode dispersion compensation apparatus using a photonic crystal structure.

2. Description of the Prior Art

Polarization mode dispersion (PMD) occurring due to birefringence (i.e., double refraction) changes certain polarization states of optical signals traveling along an optical fiber, and induces a differential group delay time between two polarization states of the optical signals during the travel of the optical signals through the optical fiber.

Such a group delay coefficient is about 0.1 ps/km in a case of low-PMD optical fibers that have been recently mass-produced, and reaches as much as a few ps/km in a case of single-mode optical fibers that have been more conventionally produced. Further, the group delay time may be more than 20 ps in a case of a long-distance fiber optical connection such as a 100 km ground transmission system using the single-mode optical fiber, and may be more than 10 ps even in a case of a transoceanic connection using recent low-PMD optical fibers.

The phenomenon of group delay time generates a problem in signal transmissions in optical communication systems of more than 10 Gbps. However, it is well known that the group delay time occurring in a specific transmission fiber is not constant with time. In fact, the group delay time may vary from time to time with physical environments, such as temperature, pressure, and the like.

Several conventional methods for compensating for the polarization mode dispersion in such optical fibers have been developed. However, the conventional polarization mode dispersion compensation methods can only compensate for a group delay time of a relatively small quantity, require expensive high-speed electronic parts, and have difficulties in scaling down in size. Further, the conventional methods have problems with respect to durability since they require moving parts.

SUMMARY OF THE INVENTION

A feature of the present invention is to provide a polarization mode dispersion compensation apparatus using a photonic crystal structure.

In order to provide the above feature of the present invention, a polarization mode dispersion compensation apparatus using a photonic crystal structure in a system transmitting optical signals through optical fibers includes an optical signal splitter for splitting incident optical signals into optical signals of a first polarization state and a second polarization state, which are perpendicular to each other in polarization directions, and for outputting the split optical signals in different directions; an optical signal combiner for combining into a single direction the optical signal of the first polarization state with the optical signal of the second polarization state, both of which being incident from a different direction, and for outputting the combined signal; an optical signal guide having a photonic crystal structure having a first waveguide for guiding the optical signals outputted from the optical signal splitter to the optical signal combiner in a first path and a second waveguide for guiding the optical signals outputted from the optical signal splitter to the optical signal combiner in a second path, wherein the first path is the shortest path and the second path is longer than the first path by a predetermined distance; a medium forming an inside of the second waveguide; a signal tab for externally outputting a portion of the optical signals outputted from the optical signal combiner and for outputting a portion of the optical signals to a feedback unit; a feedback unit for measuring a dispersion degree of the first polarization state and the second polarization state of the optical signals inputted from the signal tab, and for outputting a feedback signal for removing the polarization mode dispersion based on a result of the measurement; and an effective optical path length variation unit for varying an effective optical path length of the second path for the optical signals passing through the second waveguide based on the feedback signal outputted from the feedback unit.

The optical signal splitter and the optical signal combiner may be mediums having a photonic crystal structure each having photonic band gaps for the optical signal of either the first polarization state or the second polarization state. A medium forming the optical signal combiner and a medium forming the optical signal splitter may be the same.

The optical guide may be a medium of the photonic crystal structure that has a photonic band gap for the optical signals of the first polarization state and the optical signals of the second polarization state.

The optical signal splitter, the optical signal combiner, and the optical guide may be coupled in one body.

A shape of the second waveguide for guiding the optical signals outputted from the optical signal splitter to the optical signal combiner in the second path may be either a curve or a zigzag shape.

In operation, the effective optical path length variation unit varies a refractive index of the medium inside the second waveguide based on the feedback signal inputted from the feedback unit and varies the effective optical path length of the optical signals passing through the second waveguide.

According to a first preferred embodiment of the present invention, the effective optical path length variation unit includes a regulator for outputting an electric field control signal for applying an electric field of variable strength to the medium inside the second waveguide based on the feedback signal inputted from the feedback unit; and electrode plates for variably forming an electric field in the medium inside the second waveguide according to the electric field control signal inputted from the regulator.

According to a second preferred embodiment of the present invention, the effective optical path length variation unit includes a regulator for outputting a temperature control signal for regulating a temperature of the medium constructing the inside of the second waveguide based on the feedback signal inputted from the feedback unit; and a plurality of thermoelements for varying a temperature of the medium inside the second waveguide according to the temperature control signal inputted from the regulator.

According to a third preferred embodiment of the present invention, the effective optical path length variation unit includes a regulator for outputting a light intensity control signal for variably controlling a light intensity of the optical signals applied to the medium inside the second waveguide based on the feedback signal inputted from the feedback unit; and a light source disposed a predetermined distance from the second waveguide, and for applying the optical signals of variable light intensity to the medium inside the second waveguide according to the light intensity control signal inputted from the regulator.

According to a fourth preferred embodiment of the present invention, the effective optical path length variation unit includes a plurality of segments, each of an infinitesimal size, having a different refractive index from a refractive index of the medium inside the second waveguide; and a driving unit for inserting and removing a varying number of the plurality of segments into and out from the inside of the second waveguide based on the feedback signal inputted from the feedback unit.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-47167, filed on Aug. 9, 2002, and entitled: "Polarization Mode Dispersion Compensation Apparatus Using a Photonic Crystal Structure," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A medium having a photonic crystal structure, which is two mediums having different refractive indices periodically arranged in an arbitrary space, forms a photonic band gap in which light of frequencies in a certain range does not propagate in the medium. The causes and ranges for band gap formations may be understood by obtaining solutions to Maxwell's equations. The photonic crystal has a crystal structure size in a range from a few hundred nanometers to a few hundred micrometers based on a used frequency bandwidth.

A complete band gap that does not allow the transmission of light in a specific polarization state can be formed using a photonic crystal. An absolute band gap that does not allow the transmission of light regardless of polarization states may be also formed. Due to such characteristics, a photonic crystal is used for optical function devices such as split filters, optical waveguides, optical delay devices, lasers, and the like.

Figure 1:
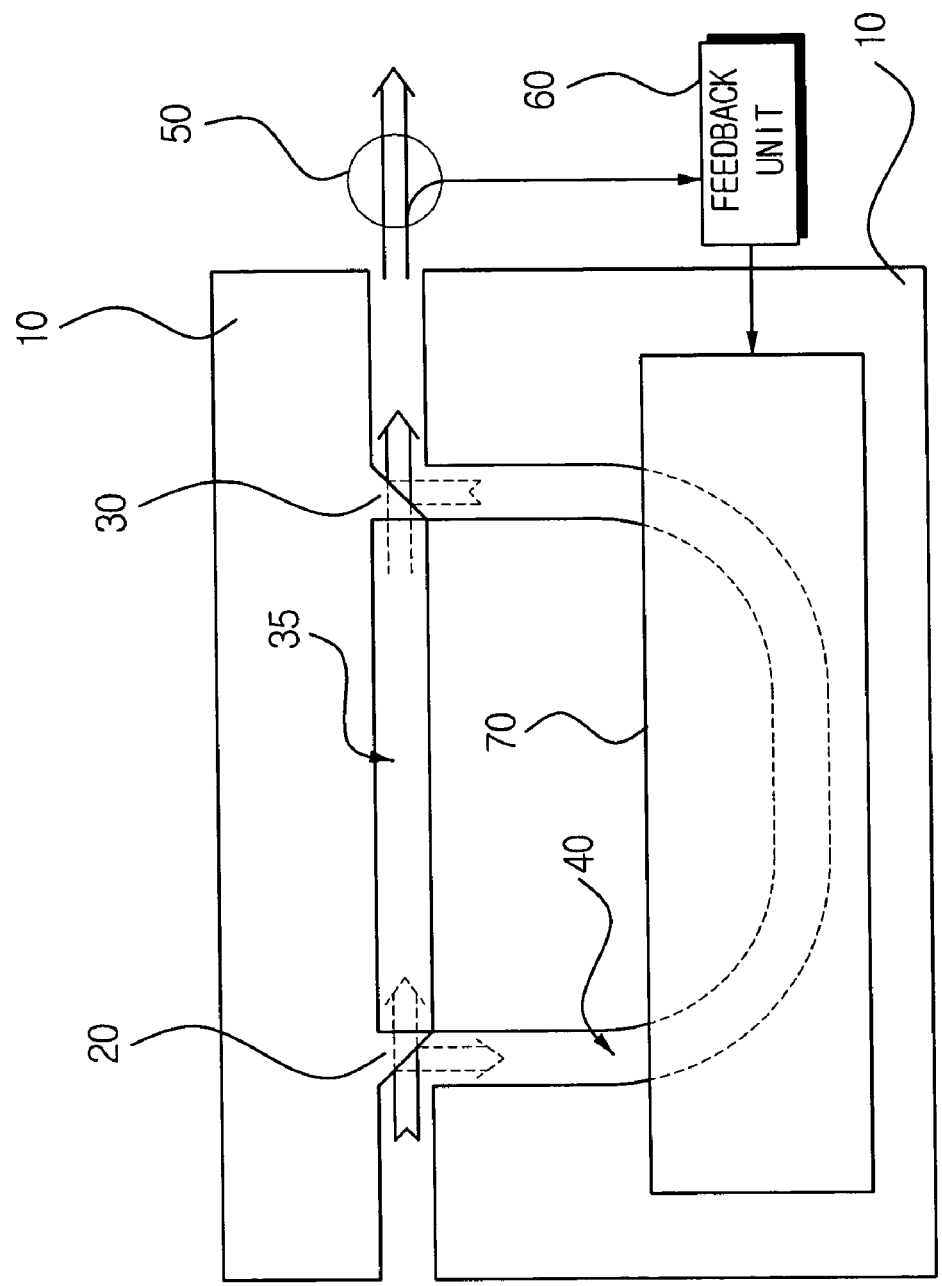
FIG. 1 illustrates a sectional view for schematically showing a structure of a polarization mode dispersion compensation apparatus using a photonic crystal structure according to an embodiment of the present invention.

FIG. 1 illustrates a view for schematically showing a structure of a polarization mode dispersion compensation apparatus using a photonic crystal structure according to an embodiment of the present invention.

As shown in FIG. 1, an optical guide 10 is constructed with a medium having a photonic crystal structure. The optical guide 10 has photonic band gaps for the two polarization states (i.e., transverse electric (TE) mode and transverse magnetic (TM) mode) of an incident optical signal and has a first waveguide 35 and a second waveguide 40 therein. Accordingly, the optical guide 10 has optical guide characteristics reflecting an optical signal regardless of an incident angle and polarization state of the optical signal.

The first waveguide 35 provides a first path, which is the shortest path to an optical signal combiner 30 from the optical signal splitter 20. The second waveguide 40 provides a second path, which is longer than the first path by a predetermined distance, and has therein a medium of a predetermined refractive index, for example, a medium of a photonic crystal structure having no photonic band gap for incident light, a liquid crystal, LiNbO3, or the like.

The optical signal splitter 20 is constructed with a medium of photonic crystal structure, coupled in one body with the optical guide 10. The optical signal splitter 20 is located at a junction of the first waveguide 35 and the second waveguide 40. Further, the medium forming the optical signal splitter 20 forms a structure having only a photonic band gap for polarization light of a specific state from incident light. Accordingly, optical signals incident to the optical signal splitter 20 are separated into two optical signals of a first polarization state and a second polarization state, which are perpendicular to each other in polarization directions. The optical signal of the first polarization state has a slow group velocity, and is sent to the first waveguide 35. The optical signal of the second polarization state has a fast group velocity and is reflected to the second waveguide 40.

The optical signal combiner 30 is constructed with a substance of photonic crystal structure and coupled in one body with the optical guide 10. The optical signal combiner 30 is located at another junction of the first waveguide 35 and the second waveguide 40. Further, the medium forming the optical signal combiner 30 is the same as that of the optical signal splitter 20. Accordingly, the optical signal combiner 30 passes an optical signal of the first polarization state incident from the first waveguide 35, and reflects an optical signal of the second polarization state incident from the second waveguide 40, to thereby combine and output the optical signals of the two polarization states in a single direction.

A signal tab 50 externally outputs the optical signals outputted from the optical signal combiner 30. In addition, the signal tab 50 outputs a portion of the signals to a feedback unit 60.

The feedback unit 60 measures a dispersion degree of the first polarization state and the second polarization state of the optical signals inputted from the signal tab 50, and outputs to an effective optical path length variation unit 70 a feedback signal for removing a polarization mode dispersion based on a measurement result thereof.

The effective optical path length variation unit 70 varies an effective optical path length of an optical signal passing through the second waveguide 40 based on the feedback signal outputted from the feedback unit 60. The effective optical path length variation unit 70 varies the effective optical path length by varying a refractive index of the medium inside the second waveguide 40.

As the effective optical path length of an optical signal of the second polarization state that passes through the second waveguide 40 increases, the group velocity of the optical signal of the second polarization state decreases, thus optical signals of the first and second polarization states output from the optical signal combiner 30 have substantially the same group velocities. As a result, the polarization mode dispersion is removed.

There are several possible methods for varying a refractive index of the medium inside the second waveguide 40. These methods include varying a medium temperature, forming a variable electrical field in the medium, applying a variable optical signal to the medium, a mechanical method, and the like.

Figure 2A:
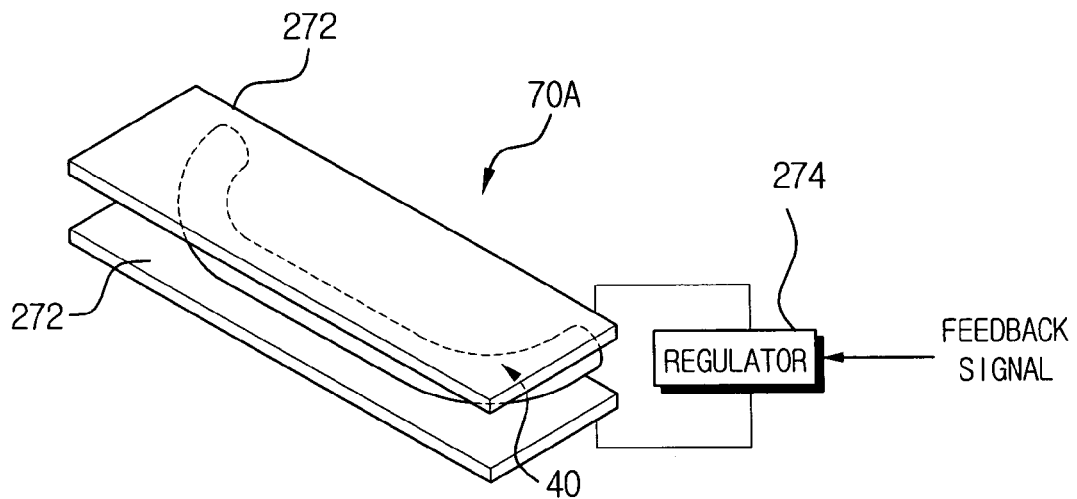
FIG. 2A illustrates a perspective view for schematically showing an effective optical path length variation unit of FIG. 1 according to a first embodiment of the present invention.
Figure 2B:
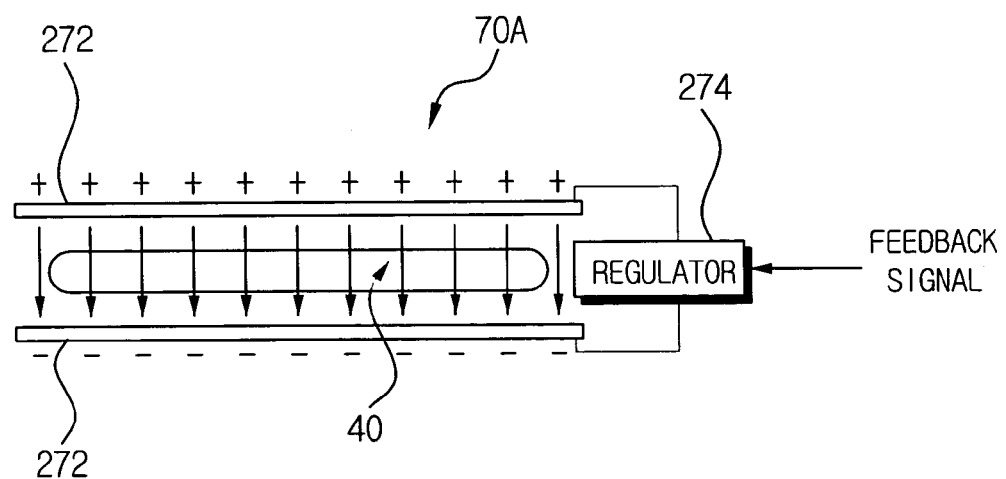
FIG. 2B illustrates a schematic side view of FIG. 2A.

Referring to FIG. 2A and FIG. 2B, a first embodiment of the present invention for varying a refractive index of a medium by forming an electric field in the medium is described.

FIG. 2A illustrates a perspective view for schematically showing an effective optical path length variation unit of FIG. 1 according to a first embodiment of the present invention. FIG. 2B illustrates a schematic side view of FIG. 2A.

According to the first embodiment of the present invention, the effective optical path length variation unit 70A includes a regulator 274 and electrode plates 272. The regulator 274 outputs an electric field control signal for applying an electric field of variable strength to a medium inside the second waveguide 40 based on a feedback signal inputted from the feedback unit 60. The electrode plates 272 are disposed spaced at a predetermined distance on an upper side and a lower side of the second waveguide 40. The electrode plates 272 form an electric field of variable strength in the medium inside the second waveguide 40 based on the electric field control signal inputted from the regulator 274.

In the first embodiment, a liquid crystal that is capable of varying a refractive index thereof according to the strength of an electric field, such as LiNbO3 or the like, is used for the medium inside the second waveguide 40.

Figure 3A:
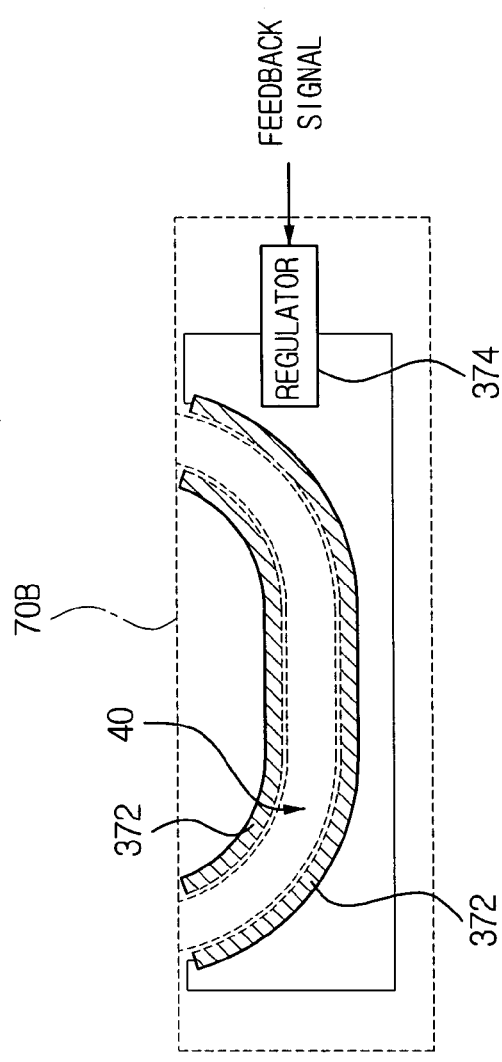
FIG. 3A illustrates a plan view for schematically showing an effective optical path length variation unit of FIG. 1 according to a second embodiment of the present invention.
Figure 3B:
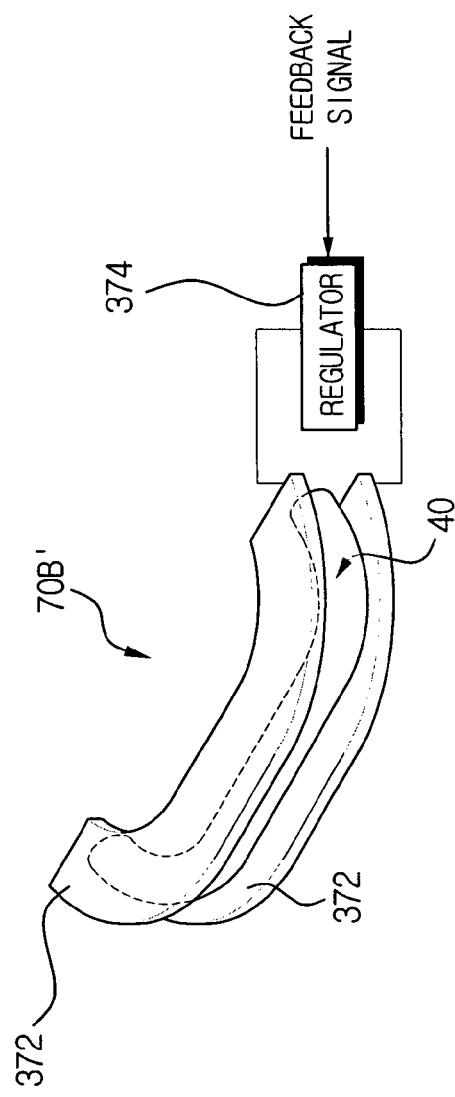
FIG. 3B illustrates a perspective view for schematically showing an alternate second embodiment of the optical path length variation unit of FIG. 3A.
Figure 3C:
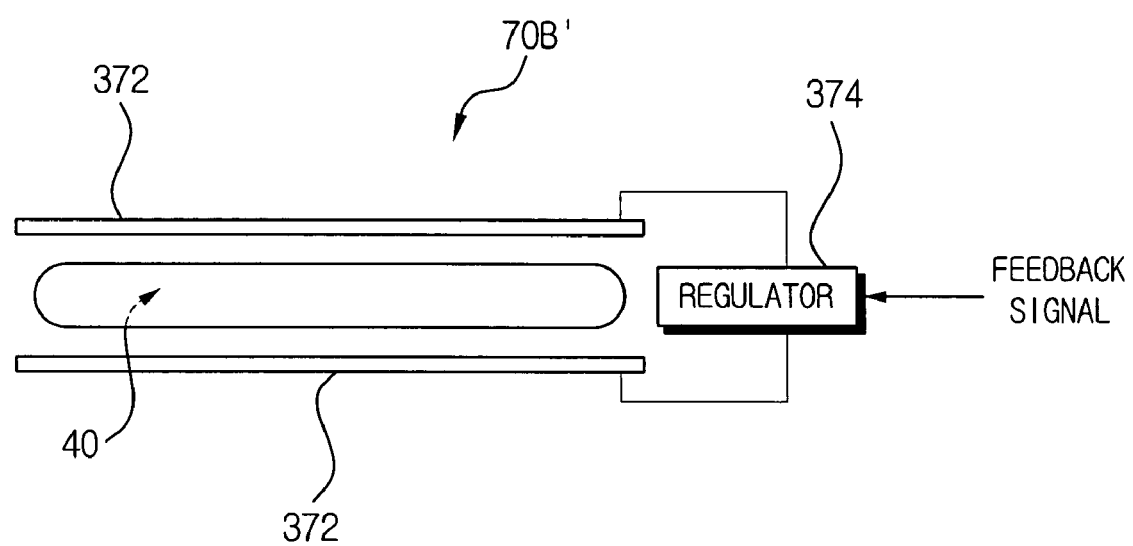
FIG. 3C illustrates a schematic side view of FIG. 3B.

Referring to FIGS. 3A, 3B, and 3C, a second embodiment of the present invention for varying a refractive index of a medium by varying a temperature of the medium is described.

FIG. 3A illustrates a plan view for schematically showing a second embodiment of the effective optical path length variation unit of FIG. 1. FIG. 3B illustrates a perspective view for schematically showing an alternate embodiment of the optical path length variation unit of FIG. 3A. FIG. 3C illustrates a schematic side view of FIG. 3B.

According to the second embodiment of the present invention, the effective optical path length variation unit 70B includes a regulator 374 and a plurality of thermoelements 372. The regulator 374 outputs a temperature control signal for varying a temperature inside the medium of the second waveguide 40 based on a feedback signal inputted from the feedback unit 60. The thermoelements 372, as shown in FIG. 3A, are spaced about the second waveguide 40 at a predetermined distance and are disposed in a shape of a cylindrical tube wrapping an outer surface of the second waveguide 40. Alternately, in an alternate second embodiment of the effective optical path length variation unit 70B' as shown in FIGS. 3B and 3C, the thermoelements 372 are disposed in a form of a flat plate at predetermined spaced positions on an upper side and a lower side of the second waveguide 40.

In operation, the thermoelements 372 are heated and cooled based on a temperature control signal inputted from the regulator 374 to vary a temperature of the medium inside the second waveguide 40. In the second embodiment, a liquid crystal that is capable of varying a refractive index thereof according to the temperature is used for the medium inside the second waveguide 40.

Figure 4:
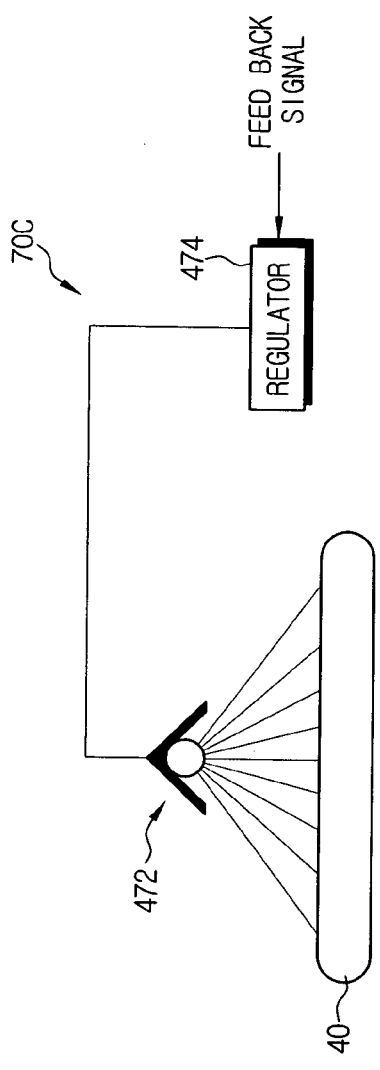
FIG. 4 illustrates a sectional view showing the effective optical distance variation unit of FIG. 1 according to a third preferred embodiment of the present invention.

Referring to FIG. 4, a third embodiment of the present invention for varying a refractive index of a medium by varying the intensity of light of an optical signal applied to the medium is described.

According to a third embodiment of the present invention, the effective optical path length variation unit 70C includes a regulator 474 and a light source 472. The regulator 474 outputs a light intensity control signal for varying the strength of an optical signal applied to the medium inside the second waveguide 40 based on a feedback signal inputted from the feedback unit 60. The light source 472 is arranged in a structure that radiates light to the medium of the second waveguide 40 at a position spaced at a predetermined distance from the second waveguide 40. The light source 472 applies to the medium inside the second waveguide 40 an optical signal of light intensity variable based on a light intensity control signal inputted from the regulator 474, to vary the refractive index of the medium. In this case, the medium that can vary the effective optical distance while varying the light intensity, i.e., a nonlinear medium is used for the medium inside the second waveguide 40. For example, if the light is applied to GaAs, the refractive index varies.

Figure 5:
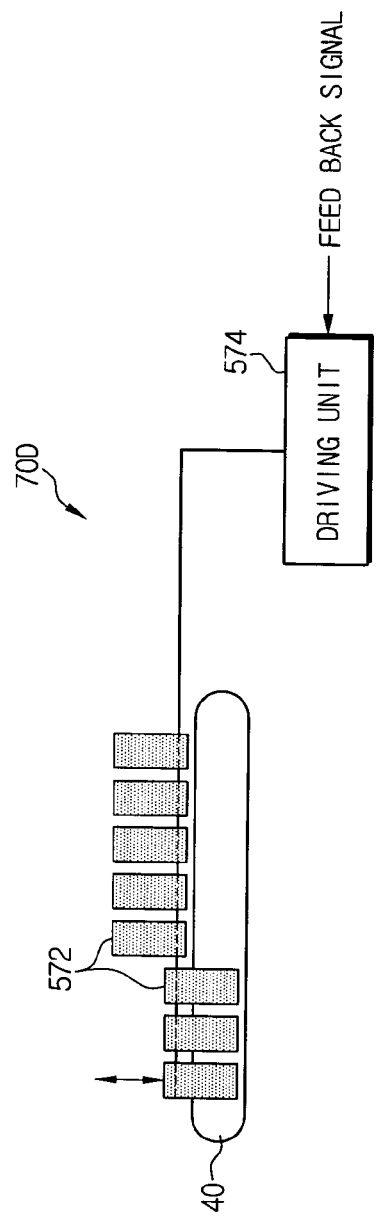
FIG. 5 illustrates a sectional view showing the effective optical distance variation unit of FIG. 1 according to a fourth preferred embodiment of the present invention.

Referring to FIG. 5, a fourth embodiment of the present invention for varying a refractive index of a medium by inserting and removing a predetermined number of segments having a different refractive index from the inside medium is described.

According to a fourth embodiment of the present invention, the effective optical path length variation unit 70D includes a plurality of segments 572 and a driving unit 574. The driving unit 574 inserts into and removes from the inside of the second waveguide a variable number of segments based on the feedback signal inputted from the feedback unit 60. The predetermined number of segments have an infinitesimal size and collectively have a different refractive index from the refractive index of the medium inside the second waveguide 40. The predetermined number of segments 572 are inserted into the medium inside the second waveguide 40 by the driving unit 574 to vary the refractive index of the medium. In this case, all of the media suggested in connection with the first, the second and the third embodiments may be used as the medium inside the second waveguide 40. In the fourth embodiment, a material with a fixed refractive index may also be used as the medium.

Although the above-described embodiments depicted the second waveguide 40 having an exemplary, relatively simple optical path having a smooth curvature, it may also be designed in various and complex forms, such as a zigzag form using characteristics of a photonic band gap. Even in a complex arrangement, a waveguide may be constructed having a compact-sized, and still can reflect the incident light of all polarization states and thus greatly increase the effective optical path length of a polarized light in a specific state greatly.

The polarization mode dispersion compensation apparatus using a photonic crystal structure according to the present invention has an advantage in that it can compensate for a group time delay of a relatively large quantity, has a strong durability, and is able to scale down in size.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polarization mode dispersion compensation apparatus using a photonic crystal structure in a system transmitting optical signals through optical fibers, comprising:

an optical signal splitter for splitting incident optical signals into optical signals of a first polarization state and a second polarization state, which are perpendicular to each other in polarization directions, and for outputting the split optical signals in different directions;

an optical signal combiner for combining into a single direction the optical signal of the first polarization state with the optical signal of the second polarization state, both of which being incident from a different direction, and for outputting the combined signal;

an optical signal guide having a photonic crystal structure having a first waveguide for guiding the optical signals outputted from the optical signal splitter to the optical signal combiner in a first path and a second waveguide for guiding the optical signals outputted from the optical signal splitter to the optical signal combiner in a second path, wherein the first path is the shortest path and the second path is longer than the first path by a predetermined distance;

a medium forming an inside of the second waveguide;

a signal tab for externally outputting a portion of the optical signals outputted from the optical signal combiner and for outputting a portion of the optical signals to a feedback unit;

a feedback unit for measuring a dispersion degree of the first polarization state and the second polarization state of the optical signals inputted from the signal tab, and for outputting a feedback signal for removing the polarization mode dispersion based on a result of the measurement; and an effective optical path length variation unit capable of varying an effective optical path length of the second path for the optical signals passing through the second waveguide based on the feedback signal outputted from the feedback unit by modifying a refractive index of the medium inside the second waveguide.

2. The polarization mode dispersion compensation apparatus as claimed in claim 1, wherein the optical signal splitter and the optical signal combiner are mediums having a photonic crystal structure each having photonic band gaps for the optical signal of either the first polarization state or the second polarization state.

3. The polarization mode dispersion compensation apparatus as claimed in claim 1, wherein a medium forming the optical signal combiner and a medium forming the optical signal splitter are the same.

4. The polarization mode dispersion compensation apparatus as claimed in claim 1, wherein the optical guide is a medium of the photonic crystal structure that has a photonic band gap for the optical signals of the first polarization state and the optical signals of the second polarization state.

5. The polarization mode dispersion compensation apparatus as claimed in claim 1, wherein the optical signal splitter, the optical signal combiner, and the optical guide are coupled in one body.

6. The polarization mode dispersion compensation apparatus as claimed in claim 1, wherein a shape of the second waveguide for guiding the optical signals outputted from the optical signal splitter to the optical signal combiner in the second path is selected from the group consisting of a curve and a zigzag shape.

7. The polarization mode dispersion compensation apparatus as claimed in claim 1, wherein the effective optical path length variation unit comprises:

a regulator for outputting an electric field control signal for applying an electric field of variable strength to the medium inside the second waveguide based on the feedback signal inputted from the feedback unit; and electrode plates for variably forming an electric field in the medium inside the second waveguide according to the electric field control signal inputted from the regulator.

8. The polarization mode dispersion compensation apparatus as claimed in claim 7, wherein the electrode plates are disposed at predetermined distances on an upper side and a lower side of the second waveguide.

9. The polarization mode dispersion compensation apparatus as claimed in claim 7, wherein a medium that is capable of varying a refractive index thereof according to the strength of an electric field is used for the medium inside the second waveguide.

10. The polarization mode dispersion compensation apparatus as claimed in claim 9, wherein the medium inside the second waveguide is $LiNbO_3$.

11. The polarization mode dispersion compensation apparatus as claimed in claim 1, wherein the effective optical path length variation unit comprises:

a regulator for outputting a temperature control signal for regulating a temperature of the medium constructing the inside of the second waveguide based on the feedback signal inputted from the feedback unit; and a plurality of thermoelements for varying a temperature of the medium inside the second waveguide according to the temperature control signal inputted from the regulator.

12. The polarization mode dispersion compensation apparatus as claimed in claim 11, wherein the plurality of thermoelements are spaced about the second waveguide at a predetermined distance and are disposed in a shape of a cylindrical tube wrapping an outer surface of the second waveguide.

13. The polarization mode dispersion compensation apparatus as claimed in claim 11, wherein the plurality of thermoelements are disposed in a form of a flat plate at predetermined spaced positions on an upper side and a lower side of the second waveguide.

14. The polarization mode dispersion compensation apparatus as claimed in claim 11, wherein the medium inside the second waveguide is a liquid crystal capable of varying its refractive index according to temperature.

15. The polarization mode dispersion compensation apparatus as claimed in claim 1, wherein the effective optical path length variation unit comprises:
- a regulator for outputting a light intensity control signal for variably controlling a light intensity of the optical signals applied to the medium inside the second waveguide based on the feedback signal inputted from the feedback unit; and
- a light source disposed at a predetermined distance from the second waveguide, and for applying the optical signals of variable light intensity to the medium inside the second waveguide according to the light intensity control signal inputted from the regulator.

16. The polarization mode dispersion compensation apparatus as claimed in claim 1, wherein the effective optical path length variation unit comprises:
- a plurality of segments, each of an infinitesimal size, having a different refractive index from a refractive index of the medium inside the second waveguide; and
- a driving unit for inserting and removing a varying number of the plurality of segments into and out from the inside of the second waveguide based on the feedback signal inputted from the feedback unit.

* * * * *